No. 766,996. PATENTED AUG. 9, 1904.
C. A. HARVEY.
SAFETY GAGE FOR LIQUIDS.
APPLICATION FILED JUNE 11, 1903.
NO MODEL.
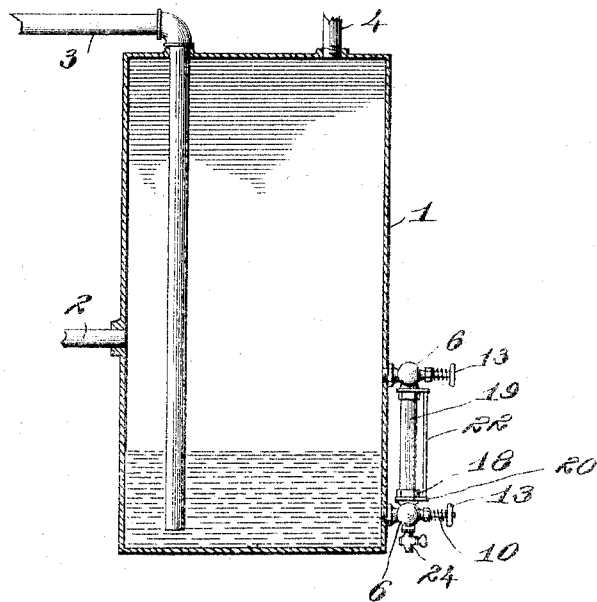
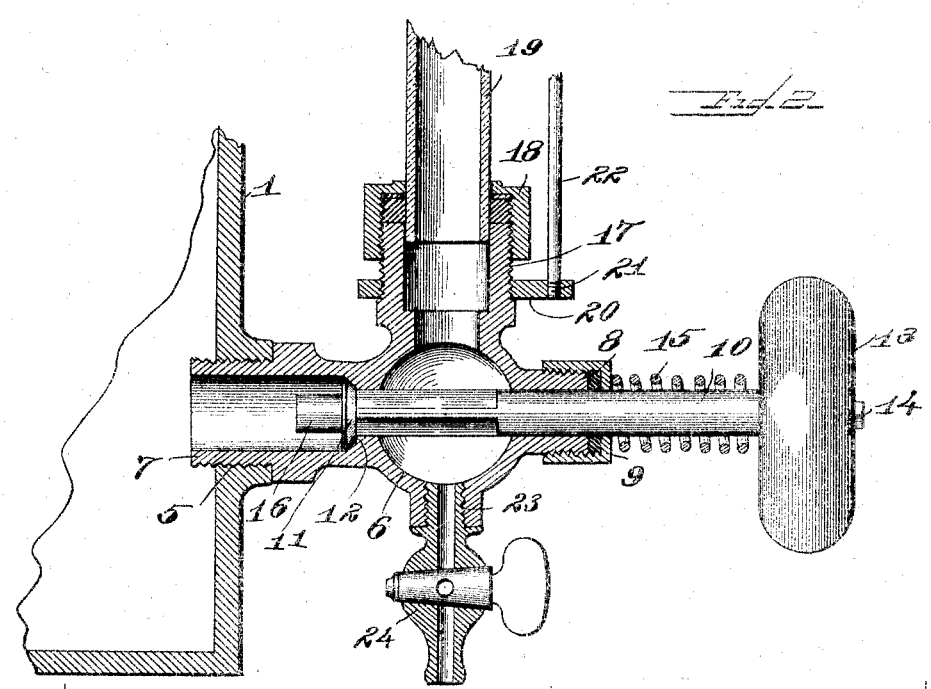
Witnesses
G. W. Rauberschmidt
George L. Chindahl
Inventor
Charles A. Harvey
By Luther L. Miller
Atty.

No. 766,996. Patented August 9, 1904.

UNITED STATES PATENT OFFICE.

CHARLES A. HARVEY, OF CHICAGO, ILLINOIS, ASSIGNOR TO THE ACME GAS COMPANY, OF CHICAGO, ILLINOIS, A CORPORATION OF ILLINOIS.

SAFETY-GAGE FOR LIQUIDS.

SPECIFICATION forming part of Letters Patent No. 766,996, dated August 9, 1904.

Application filed June 11, 1903. Serial No. 160,977. (No model.)

*To all whom it may concern:*

Be it known that I, CHARLES A. HARVEY, a citizen of the United States, residing at Chicago, in the county of Cook and State of Illinois, have invented certain new and useful Improvements in Safety-Gages for Liquids, of which the following is a specification.

This invention relates to liquid-gages, and refers particularly to a gage arranged to be normally out of communication with the main body of the liquid.

Gages as heretofore constructed usually have a direct and uninterrupted communication with the body of liquid whose height the gage is intended to indicate. The indicating portion of the gage commonly is of glass, and thus may be and frequently is broken by sudden changes in temperature or by accidental blows. If the liquid within the gage is inflammable, a small fire in proximity to the glass may break the gage and open communication with the interior of the receptacle, permitting the escape of the oil from the receptacle to the flames. On account of the fragility of such gages the rules adopted by many boards of underwriters forbid their use.

The object of this invention is the production of a safety-gage that shall be in communication with the liquid whose height it is intended to indicate only when a reading of the gage is desired and then only by the positive act of the operator. In this instance the gage is provided with means for automatically closing it and cutting off communication between the indicator of the gage and the body of liquid.

In the accompanying drawings, Figure 1 is a view illustrating the application of this gage to one of the tanks of a carbureter. Fig. 2 is a longitudinal vertical section through the gage mechanism.

Referring to the drawings, 1 indicates the carbureter-tank; 2, an oil-pipe communicating with the interior of said tank to supply it with oil; 3, an air-pipe leading from a suitable blower or air-compressor (not shown) to a point within the carbureter-tank near the bottom thereof, and 4 an escape-pipe for the gas.

In the side of the tank 1 and respectively above and below the normal level of the liquid therein are two openings 5, interiorly screw-threaded for attaching to the tank 1 the gage to be next described. In the embodiment herein shown of this invention said gage comprises two valves and a connecting gage-glass. These valves are substantially alike, each comprising a hollow body portion 6, having an externally-screw-threaded tubular stem 7, adapted to lie within one of the openings 5 of the tank 1 and make a liquid-tight joint between said tank and the body portion 6. The opposite side of the body portion 6 is provided with the tubular stem 8, alined with the stem 7 and screw-threaded to receive the stuffing-box 9. A valve-rod 10 lies within the stems 7 and 8, said rod being provided with a valve 11, fixed with relation to said rod and adapted to be seated upon the annular valve-seat 12. Within the spherical body portion 6 the valve-rod 10 is formed triangular in cross-section to permit of a flow of liquid between the sides of said rod and the annular walls of the valve-seat 12. The forward portion of the rod 10 is cylindrical save for a little distance at its extreme forward end, where it is square to receive an operating-handle 13 and screw-threaded for a nut 14 to secure said handle in postion. Between the handle and the stuffing-box 19 the valve-rod 10 is surrounded by a coil-spring 15, the tendency of which is to hold the valve 11 firmly upon its seat 12. The extreme rear end of the rod is provided with a transverse groove 16 to receive the blade of a screw-driver. The body portion 6 of each of the valves is provided with a tubular stem 17, communicating with the interior of said body portion, which stem has a stuffing-box 18 to make a liquid-tight connection with the end of a gage-glass 19 in a well-known manner. This stem is also provided with a bracket 20, having two openings 21 to receive the guard-rods 22 for the glass. The lower side of the body portion 6 of the lower valve is provided with a screw-threaded opening 23, adapted to receive a pet-cock 24 of ordinary construction having communication with the interior of said body portion, by means of which pet-cock the interior of the body portion of the lower valve and the gage-glass may be drained.

In operation the gage is secured to the side of a tank, as is clearly shown in the drawings. Liquid is supplied to the tank in any suitable manner, and when the gage is to be operated to determine the height to which the liquid has risen in said tank the handle 13 of each valve is pressed inwardly, pushing the valve 11 from the seat 12 and opening communication between the interior of the body portion 6 of each of said valves and the tank 1. Liquid flowing into the body portion 6 of the lower valve rises within the gage-glass 19 to a level with the surface of the body of liquid in the tank. When the pressure upon the handles 13 is removed, the coil-springs 15 cause the valves 11 to resume their seats, cutting off communication between the interior of the gage and the liquid within the tank. If it is desirable, the liquid within the gage may be drawn out by opening the pet-cock 24, or said liquid may stand in the glass until another reading, when said liquid will either rise or fall to the changed level assumed by the body of the liquid in the tank.

I have arranged the valves 11 to open inwardly of the tank 1, so that should the coil-springs 15 at any time become ineffective the pressure existing within said tank will force said valves against their seats, and thus automatically cut off the accidental escape of the contents of the tank.

The device herein illustrated and described is susceptible of many modifications in the form and arrangement of its parts without departing from the spirit and scope of my invention. Wherefore I do not limit myself to the particular construction herein set forth.

I claim as my invention—

1. In a liquid-gage, in combination, a body portion having a valve-seat; a gage-glass; a valve-rod having a valve adapted to be seated upon said valve-seat, said valve-rod for a portion of its length being of a cross-section other than round to permit the flow of liquid around it; and a spring always active and tending to slide said valve-rod to hold the valve seated.

2. In a liquid-gage, in combination, a body portion having a valve-seat; a gage-glass extending upwardly from said body portion; a longitudinally-slidable valve-rod having a valve adapted to be seated upon said valve-seat, said valve-rod for a portion of its length being of a cross-section other than round to permit the flow of liquid around it; a spring always active and tending to slide said valve-rod in a direction to seat said valve; and a cock for draining said body portion.

CHARLES A. HARVEY.

Witnesses:
L. L. MILLER,
GEORGE L. CHINDAHL.